(12) United States Patent
Zhou

(10) Patent No.: US 8,942,573 B2
(45) Date of Patent: *Jan. 27, 2015

(54) BLIND EQUALIZATION ALGORITHMS FOR ADAPTIVE POLARIZATION RECOVERY AND PMD COMPENSATION

(71) Applicant: AT&T Intellectual Property I, L.P., Atlanta, GA (US)

(72) Inventor: Xiang Zhou, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/656,043

(22) Filed: Oct. 19, 2012

(65) Prior Publication Data

US 2013/0058644 A1  Mar. 7, 2013

Related U.S. Application Data

(63) Continuation of application No. 12/553,104, filed on Sep. 3, 2009, now Pat. No. 8,320,778.

(51) Int. Cl.
| | | |
|---|---|---|
| H04B 10/06 | (2006.01) | |
| H04B 10/2569 | (2013.01) | |
| H04B 10/2513 | (2013.01) | |
| H04B 10/60 | (2013.01) | |
| H04B 10/00 | (2013.01) | |

(52) U.S. Cl.
CPC ...... *H04B 10/2569* (2013.01); *H04B 10/25133* (2013.01); *H04B 10/60* (2013.01); *H04B 2210/252* (2013.01)
USPC ............ 398/208; 398/202; 398/203; 398/206

(58) Field of Classification Search
USPC .................................................. 398/202–214
See application file for complete search history.

(56) References Cited

U.S. PATENT DOCUMENTS

2007/0206707 A1  9/2007  Chen
2010/0067902 A1  3/2010  Sun et al.

*Primary Examiner* — Daniel Dobson
(74) *Attorney, Agent, or Firm* — Wolff & Samson PC

(57) ABSTRACT

A device and method are disclosed for blind equalization of an optical signal to implement adaptive polarization recovery, Polarization Mode Dispersion (PMD) compensation, and residual Chromatic Dispersion (CD) compensation in a digital coherent optical communication system.

20 Claims, 7 Drawing Sheets

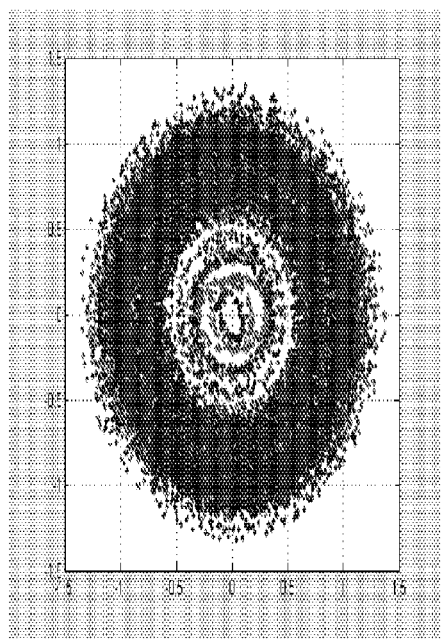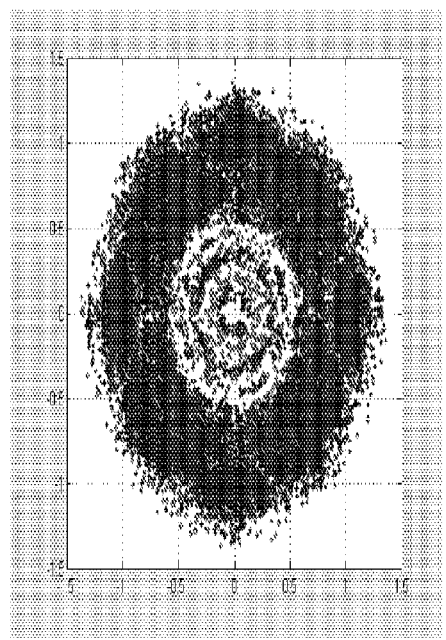
Fig. 6a
Fig. 6b

BLIND EQUALIZATION ALGORITHMS FOR ADAPTIVE POLARIZATION RECOVERY AND PMD COMPENSATION

This application is a continuation of U.S. patent application Ser. No. 12/553,104, filed on Sep. 3, 2009, which is incorporated herein by reference in its entirety.

FIELD OF THE DISCLOSURE

The present disclosure relates generally to communication networks, and more particularly, to a device and method of blind equalization for adaptive polarization recovery, polarization mode dispersion (PMD) and chromatic dispersion (CD) compensation for advanced modulation formats.

BACKGROUND

Wave division multiplexing (WDM) optical networks are well known in the art. A WDM channel is typically transmitted by a single mode semiconductor laser. Information to be communicated is imposed on the light by modulating the laser current or by externally modulating the light by applying a voltage to a modulator coupled to the laser source. A receiver employs a photo-detector that converts the light into electric current. Typically, there are two employed methodologies for detecting the received light: direct detection and coherent detection.

Due to the rapid growth of optical networks and the need for greater capacity, significant research has focused on finding efficient multi-level optical modulation formats. Any digital modulation scheme uses a finite number of distinct signals to represent digital data. Phase-shift-keying (PSK) uses a finite number of phases, each assigned a unique pattern of binary bits. Usually, each phase encodes an equal number of bits, and each pattern of bits forms the symbol that is represented by the particular phase. The demodulator, which is designed specifically for the symbol-set used by the modulator, determines the phase of the received signal and maps it back to the symbol it represents, thereby recovering the original data. The receiver compares the phase of the received signal to a reference signal. This expedient utilizes coherent detection and is referred to as CPSK.

BPSK (also sometimes called PRK, Phase Reversal Keying) is the simplest form of PSK. It utilizes a pair of phases separated by 180° and is known as 2-PSK. Quaternary or quadriphase PSK, 4-PSK, or 4-QAM (QPSK) uses four points on a constellation diagram as is known in the art. The four-phase QPSK can encode two bits per symbol—twice the rate of BPSK—and experimentation has demonstrated that this may double the data rate compared to a BPSK system while maintaining the bandwidth of the signal. Alternatively, QPSK can maintain the data-rate of BPSK at half the requisite bandwidth.

Optical modulations based on four-level quadrature-phase-shift-key (QPSK) have been effectively demonstrated for both 40 Gb/s and 100 Gb/s optical transmission. In the quest for even higher spectral efficiency, eight-level 8-PSK modulation has been proposed and demonstrated experimentally.

8-QAM is another eight-level modulation format. In comparison to 8-PSK, 8-QAM is tolerant of greater noise (on the order of 1.6 dB), with identical spectral utilization. Now, even 16-QAM expedients are being developed and introduced.

In all of these systems, the modulated signal is typically detected either via direct or coherent detection, where a photo-detector receives the modulated optical signal and converts the same to an electrical signal representative of the optical power, or where a discriminator is utilized prior to the photo-detector to convert the phase changes into power values that the photo-detector can detect, respectively.

Coherent detection treats optical signals in a manner analogous to RF, with response to the amplitude and phase of each wavelength. In coherent detection, an incoming optical signal is mixed with light from a local oscillator source. When the combined signals are detected by a photo-detector, the photocurrent contains a component at a frequency that is the difference between the signal frequency and the local oscillator frequency. This difference is known as an intermediate frequency and contains all the information (amplitude and phase) carried by the optical signal. Since the new carrier frequency is much lower, all information can be recovered using typical radio demodulation methodology. Coherent receivers only see signals that are close in wavelength to the local oscillator and thus by tuning the local oscillator's wavelength, a coherent receiver operates in a manner analogous to a tunable filter. Homodyne detection produces a photocurrent that is passed to a decision circuit that outputs the unambiguous "1" or "0" values. Heterodyne detection requires that the photocurrent be processed by a demodulator to recover the information from the intermediate frequency. Balanced detection replaces a 2:1 combiner with a 2:2 combiner, where each of the outputs are detected and the difference then taken by a subtracting component.

The aforementioned PDM modulation formats utilize a constant modulus algorithm (CMA) for blind polarization recovery, polarization-mode dispersion (PMD) and residual chromatic dispersion (CD) compensation as described by D. N. Godard, "Self-recovering equalization and carrier tracking in two-dimensional data communication systems", IEEE Trans. Communications, Vol. Com-28, Nov. 11, 1980, pp. 1867-1875, which is incorporated by reference herein. More advanced modulation formats such as PDM-8 QAM (quadrature-amplitude modulation) and PDM-16 QAM have also been explored theoretically for high-speed and high-spectral efficiency transmission as disclosed in Joseph M. Kahn and Keang-Po Ho, "Spectral Efficiency Limits and Modulation/Detection Techniques for DWDM Systems", IEEE Journal of Selected Topics in Quantum Electronics, Vol. 10, No. 2, March/April 2004, pp. 259-272, which is incorporated by reference herein. For a PDM-M-QAM signal, however, the traditional CMA blind equalization algorithm is not effective for polarization de-multiplexing and PMD compensation. The is because such modulation formats do not present constant symbol amplitude, and therefore the error signals calculated by using the CMA will not approach zero, even with the ideal signal. Non-zero error signals not only leads to extra noise after equalization, but also cause a problem with local minima. Therefore a better equalization algorithm is required for such advanced modulation formats.

SUMMARY OF THE DISCLOSURE

In accordance with an aspect of the disclosure, a device for compensating a received signal, preferably a converted optical-to-electrical signal, comprises: a module including machine executable instructions which, when executed by a processor, utilize a plurality of reference circles, each having a different modulus to modify the received signal.

In accordance with another aspect of the disclosure, a method for compensating a received signal, comprises: modifying the received signal by executing machine readable instructions with at least one processor to utilize a plurality of reference circles, each having a different modulus to modify the received signal.

These aspects of the disclosure and further advantages thereof will become apparent to those skilled in the art as the present disclosure is described with particular reference to the accompanying drawings.

BRIEF DESCRIPTION OF THE DRAWINGS

FIGS. 6(a) and 6(b) show simulated results for a 112 Gb/s PM-8 QAM signal in accordance with conventional CMA, with FIG. 6(a) showing the constellation after blind equalization, and FIG. 6(b) showing the constellation after running carrier recovery program;

DETAILED DESCRIPTION OF THE PREFERRED EMBODIMENT

Embodiments of the disclosure will be described with reference to the accompanying drawing figures wherein like numbers represent like elements throughout. Before embodiments of the disclosure are explained in detail, it is to be understood that the disclosure is not limited in its application to the details of the examples set forth in the following description or illustrated in the figures. The disclosure is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

In accordance with aspects of the disclosure, a blind equalization algorithm is proposed for adaptive polarization recovery, Polarization Mode Dispersion (PMD) and residual Chromatic Dispersion (CD) compensation in a digital coherent optical communication system, employing polarization-division-multiplexed (PDM) and M-ary quadrature amplitude modulation (QAM) formats. Unlike the constant modulus algorithm (CMA), which utilizes a single reference circle for the error signal calculation, disclosed methodology introduces multiple reference circles, each with a different modulus in a cascaded fashion to calculate the error signal. As a result, the error signal can approach zero for an ideal M-arry QAM signal, which is impossible with conventional CMA. The effectiveness of the proposed algorithm has been verified by numerical simulation using a 114 Gb/s PDM-8 QAM signal as an example. The numerical simulation also shows that the conventional CMA is no longer effective for PDM-M-QAM signals.

Figure 1:
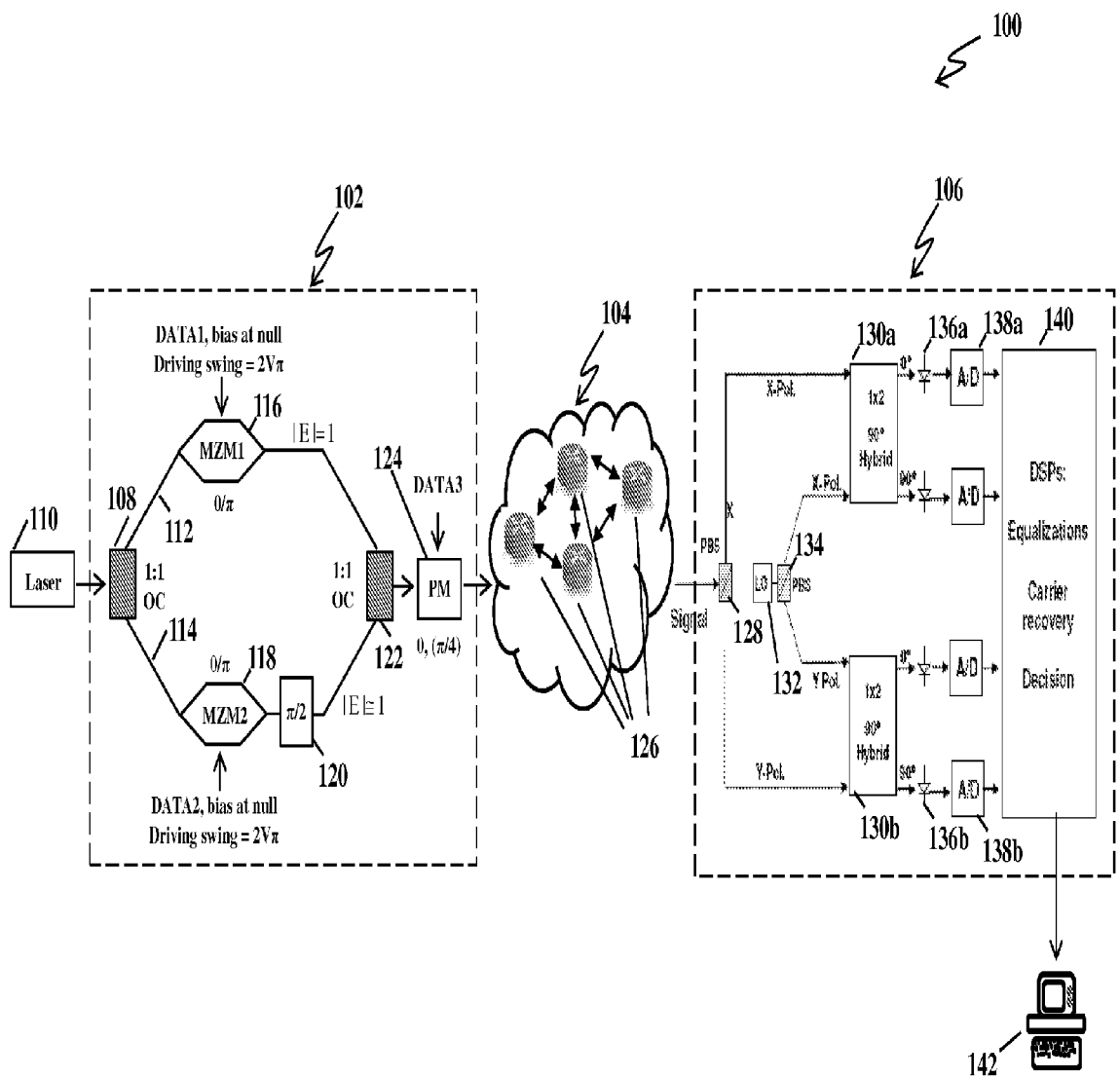
FIG. 1 is a high-level schematic of a representative optical network for carrying out aspects of the disclosure.

FIG. 1 is a schematic of the general architecture of a conventional optical network 100. It is comprised of a modulator 102, an intermediate optical communications network represented by cloud 104 and a photo-detection system 106 for receiving and converting the light signals to electrical signals. The modulator 102 comprises an optical splitter 108 that splits the incoming light from a CW laser source 1102 into two components—a first part 112 and a second part 114. The first and second parts 112, 114 are modulated by Mach-Zehnder Modulators MZM1 116 and MZM2 118, which are driven by binary signals DATA1 and DATA2, respectively, and biased at the null point with a driving swing of 2 Vπ. The modulated lower part from MZM2 118 is applied to a phase shifter 120 to impose a phase shift of π/2. The modulated first part 112b and modulated and phase-shifted lower part are combined by a 1:1 optical combiner 122 and the output thereof subsequently phase-modulated by (0, π/4) with binary signal DATA3 at phase-modulator 124 to produce the modulated output signal, in this example 8-QAM.

The exemplary photo-detection system 106 of FIG. 1 applies an incoming optical signal to a polarization beam splitter 128. The x-polarization is applied to a 1×2 90° phase and polarization hybrid 130a and the y-polarization to 1×2 90° phase and polarization hybrid 130b. A Local Oscillator (LO) 132 is coupled to a polarization beam splitter 134 such that the x-polarization is applied to hybrid 130a and the y-polarization to hybrid 130b. Each hybrid 130a, 130b has two outputs with two respective polarization states. The top two outputs have the LO in one state of polarization (horizontal) and the lower two outputs have the LO in the orthogonal state of polarization. These are received by a plurality of photo-detectors 136a and 136b, respectively, which output a corresponding photocurrent. The respective signals are 90° out of phase from each other and sampled by four analog-to-digital (A/D) converters 138a, 138b, respectively. The sample values are processed by a digital signal processor (DSP) 140 into output which can be sent to a network access device, a personal computer 142 as in this example.

Digital signal processing (DSP) based coherent optical communication provides significant performance advantages with respect to linear distortion. The aim of digital coherent detection technology is to extract both the amplitude and phase information of a modulated optical signal so that a linear digital finite impulse response (FIR) equalizer can be used to perform chromatic dispersion (CD) compensation, polarization recovery, and polarization mode dispersion (PMD) compensation in the electrical domain. As described above, typically, the optical field of the modulated signal is extracted by coherent mixing continuous wave light from a local oscillator prior to photo detection. Note that the coherent-mixed term is linearly proportional to the optical field of the original signal, but the direct square-law detection of the modulated signal will cause distortion to the extracted signal. Such distortion may severely degrade the performance of DSP-based dispersion compensation, polarization recovery and PMD compensation. In accordance with an aspect of the disclosure, the DSP is modified to provide an improved methodology for blind equalization.

Figure 2:
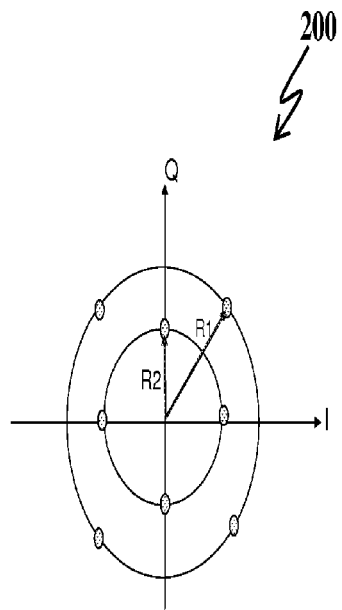
FIG. 2 shows a typical circular 8-QAM constellation.

FIG. 2 depicts a typical circular 8-QAM constellation 200, where the eight constellation points are disposed on two circles with different radii—R1 and R2. Typically, the error signal is calculated based on only one reference circle with a constant modulus of $$\varepsilon = |z|^P - \frac{E|Z|^{2P}}{E|Z|^P} \tag{1}$$

where p is the order number (p=2 is the widely used order), Z is the signal at the output of the equalizer and E denotes the statistical expectation operation. From (1), the error signal cannot approach zero even with an ideal 8-QAM signal.

In accordance with an aspect of this disclosure, the error signal is calculated by introducing two reference circles with different modulus/radii in a cascaded way as defined by the following equation:

$$\varepsilon = ||z|^P - C_1| - C_2 \tag{2}$$

$$C_1 = \frac{R1^P + R2^P}{2}$$

$$C_2 = \frac{R1^P - R2^P}{2}$$

For p=1, the radius of the first reference circle is given by $$\frac{R1 + R2}{2}$$

and the radius of the second reference circle is given by $$\frac{R1 - R2}{2}.$$

Eq. (2) shows that the error signal will approach zero for an ideal 8-QAM signal.

Figure 3:
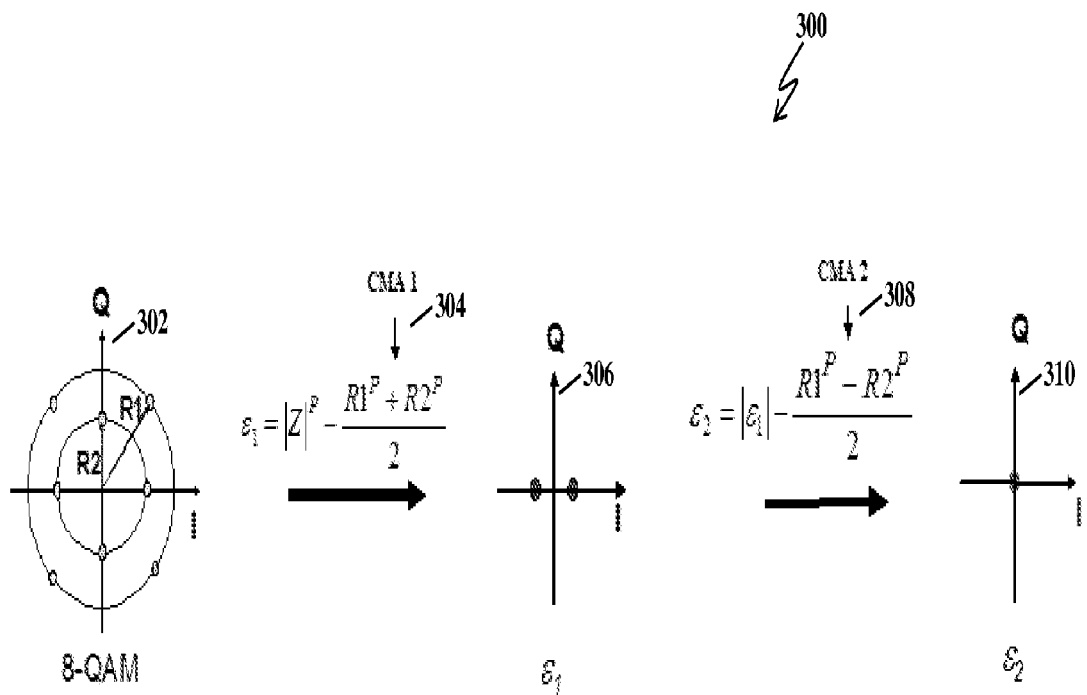
FIG. 3 illustrates a cascaded configuration of reference circles for calculating signal error in accordance with the present disclosure.

FIG. 3 illustrates a cascaded error signal calculation process 300 based on Eq. 2. Step 302 identifies the starting circular 8-QAM constellation (200 shown in FIG. 2). The process jumps to step 304, wherein a Constant Modulus Algorithm (CMA) calculates an intermediate error $\epsilon_1$ as shown by 306. Next, step 308 corresponds to the CMA calculation of $\epsilon_2$, which yields the final error as shown in 310.

The algorithm shown in Eq. 2 can be generalized by introducing another order number q as follows, $$\Delta^{(p,q)} = ||z|^P - C_1|^q - C_2 \tag{3}$$

$$C_1 = \frac{R1^P + R2^P}{2}$$

$$C_2 = \left(\frac{R1^P - R2^P}{2}\right)^q$$

By choosing different combination of (p, q) different convergence and signal-to-noise performance combinations can be obtained. Eq. 3 can then be further generalized as the following equation:

$$\epsilon = f_2(f_1(|Z|, C_1), C_2) \tag{4}$$

where $f_1$ and $f_2$ are two functions (of two variables), and $C_1$ and $C_2$ are two constants. The aim is to find two functions, $f_1$ and $f_2$, and two constants, $C_1$ and $C_2$, to make $f_2(f_1(|Z|, C_1), C_2)$ approach zero for an 8-QAM ideal signal.

The process and implementation shown in the above example can also be applied to a higher-level modulation format such as 16-QAM, and others expedients as will be appreciated by those skilled in the art.

Figure 4:
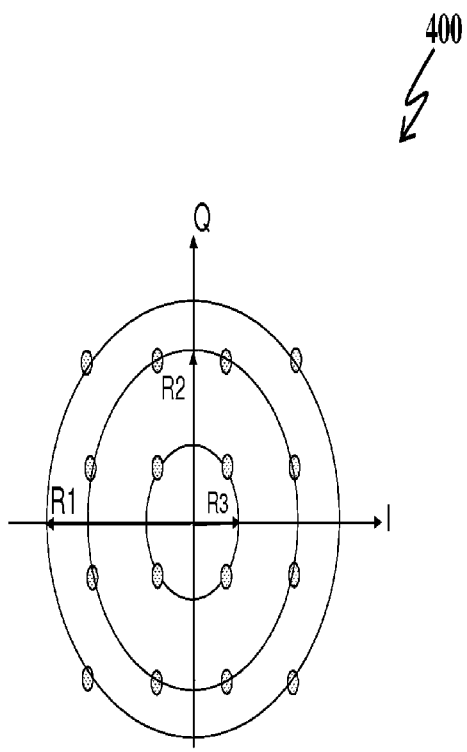
FIG. 4 depicts a rectangular 16-QAM signal constellation.

FIG. 4 depicts a rectangular 16-QAM signal, where the 16 constellations are diposed on three circles with different radii (R1, R3 and R3). In accordance with this example, the error signal can be calculated with the following algorithm by introducing three reference circles, each with a respective modulus as follows:

$$\varepsilon = |||z|^P - C_1| - C_2| - C_3 \tag{5}$$

$$C_1 = \frac{R2^P + R3^P}{2}$$

$$C_2 = \frac{R1^P - R3^P}{2}$$

$$C_3 = \frac{R1^P - R2^P}{2}$$

For p=1, the radius/modulus of the three reference circles is given by $$\frac{R2 + R3}{2}, \frac{R1 - R3}{2} \text{ and } \frac{R1 - R2}{2},$$

respectively. Through a three step cascading calculation (not shown) as shown in FIG. 3 for the 8-QAM example, the error signal can be calculated utilizing Eq. 5. Similar to the 8-QAM example, the error for this example will also approach zero for an ideal 16-QAM signal. Similar to Eq. 3, Eq. 5 can then be further generalized as the following equation:

$$\epsilon = f_3(f_2(f_1(|Z|, C_1), C_2), C_3) \tag{6}$$

where $f_1$, $f_2$ and $f_3$ are three functions (of two variables), and $C_1$, $C_2$ and $C_3$ are three constants.

Figure 5A:
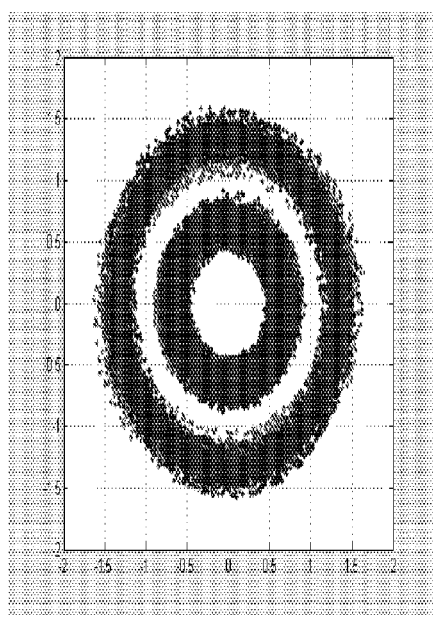
FIGS. 5(a) and 5(b) show simulated results for a 112 Gb/s PM-8 QAM signal in accordance with the present disclosure, with FIG. 5(a) showing the constellation after blind equalization, and FIG. 5(b) showing the constellation after carrier recovery.
Figure 5B:
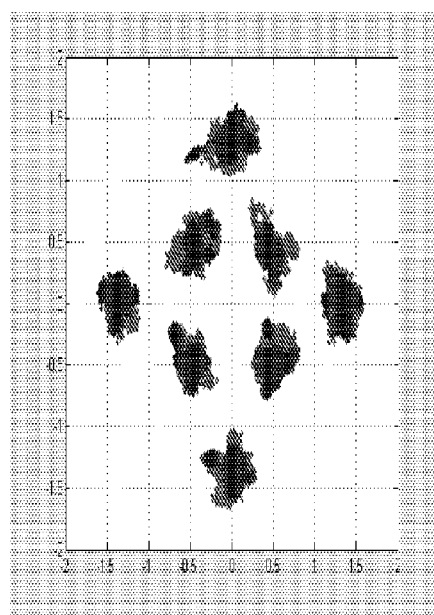

To verify the effectiveness of the disclosed solution, numerical simulations were conducted by using a 114 Gb/s PM-8-QAM signal. For this simulation, the error signal is calculated based on Eq. 2 with p=1. The transmission link consisted of 6 spans of 100 km of standard single mode fiber (SSMF) and EDFA-only amplification. No optical dispersion compensation was used in this simulation. The loss, the PMD coefficient and the CD coefficient of the SSMF are assumed to be 0.2 dB/km, 0.1 ps/km½ and 17 ps/nm.km, respectively. The launch signal power is −1 dBm. After 600 km transmission, loading optical noise is added to reduce the received optical-to-signal noise ratio to 20 dB. Then the 114 Gb/s PM-8QAM signal (19-Gbaud/s) is received by a polarization- and phase-diversity single-ended coherent receiver as described in the above reference by M. Seimetz et al., where the ratio between the local oscillator power to the received signal power is set to be 18 dB. The received I and Q components in both polarizations were then digitized at 2× baud rate sampling rate. The digitized signal first passed through a fixed finite impulse response filter (FIR) with 112 T/2-spaced taps for CD compensation. This FIR filter compensated about 95% of the total CD. After this fixed CD compensation, four adaptive FIR filters (in butterfly configuration) operating with the above proposed blind equalization algorithm (Eq.2 with p=1) were then used for polarization recovery, PMD and residual CD compensation. The constellation obtained via this procedure is shown in FIG. 5(a). The constellation after carrier frequency and phase recovery is shown in FIG. 5(b). The recovered 8-QAM constellation can now be seen. As a comparison, the recovered constellation by using the conventional CMA algorithm with order number p=2 is shown in FIGS. 6(a) and (b). This algorithm is no longer effective for PM-8QAM modulation formats.

The above-described CMA processes may be implemented by program modules that are executed by a computer. Generally, program modules include routines, objects, components, data structures and the like that perform particular tasks or implement particular abstract data types. The term "program" as used herein may connote a single program module or multiple program modules acting in concert. The disclosure may be implemented on a variety of types of computers, including personal computers (PCs), hand-held devices, multi-processor systems, microprocessor-based programmable consumer electronics, network PCs, minicomputers, mainframe computers and the like. The disclosure may also be employed in distributed computing environments, where tasks are performed by remote processing devices that are linked through a communications network. In a distributed computing environment, modules may be located in both local and remote memory storage devices.

Figure 7:
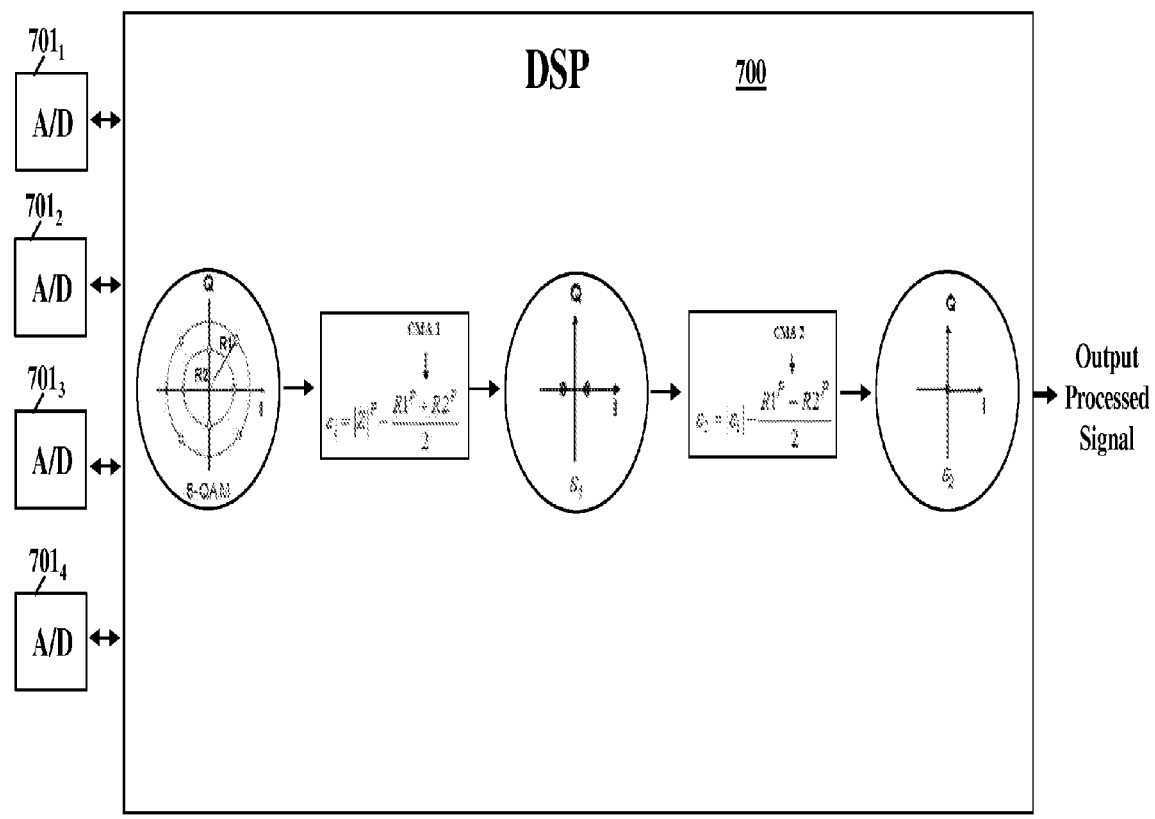
FIG. 7 illustrates a representative digital signal processing (DSP) module logic in accordance with the disclosure.

An exemplary processing module for implementing the methodology above may be hardwired in the DSP 700 generally shown in FIG. 7, or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present disclosure are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to the processor. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

In the numerical simulation illustrated and described above, the single-carrier based PolMUX-8PSK modulation format is merely exemplary.

Advantageously, the disclosed methodology can be used for other single-carrier based or multi-carrier (e.g. OFDM) based modulation formats. Additionally, the processes disclosed herein are not limited to the field of optical networking communications, and has applications in any other field where a coherent optical receiver is used as an information receiving/detection device.

The foregoing detailed description is to be understood as being in every respect illustrative and exemplary, but not restrictive, and the scope of the disclosure disclosed herein is not to be determined from the description of the disclosure, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure.

I claim:

1. A non-transitory computer readable medium storing computer program instructions, which, when executed on a processor, cause the processor to perform operations comprising:
   receiving an optical signal (Z); and
   calculating an error $\epsilon$ signal, representative of distortion in the optical signal (Z), by utilizing a plurality of reference circles cascaded relative to each other, wherein the error $\epsilon$ signal is defined by $\epsilon = f_2(f_1(|Z|, C_1), C_2)$, wherein each of the reference circles $C_1$, $C_2$ have different radii R1, R2, the reference circles $C_1$, $C_2$ defined by:

$$C_1 = \frac{R1^p + R2^p}{2}$$

$$C_2 = \left(\frac{R1^p - R2^p}{2}\right)^q$$

wherein p and q are selected order numbers,
   wherein $f_1$, $f_2$ are each two variable functions and $C_1$, $C_2$ are each constants, such that the two variable functions, $f_1$, $f_2$, and the constants, $C_1$, $C_2$, are determined to make $f_2(f_1(|Z|, C_1), C_2)$ approach zero for a quadrature amplitude modulation signal.

2. The non-transitory computer readable medium of claim 1, wherein utilizing the plurality of reference circles compensates for chromatic dispersion.

3. The non-transitory computer readable medium of claim 1, wherein utilizing the plurality of reference circles compensates for polarization mode dispersion.

4. The non-transitory computer readable medium of claim 1, wherein the plurality of reference circles each include a plurality of constellation points.

5. The non-transitory computer readable medium of claim 1, wherein the plurality of reference circles each have a different modulus.

6. The non-transitory computer readable medium of claim 1, wherein the quadrature amplitude modulation signal comprises an 8-quadrature amplitude modulation signal.

7. The non-transitory computer readable medium of claim 1, wherein the plurality of reference circles modify the optical signal (Z) to cause adaptive polarization recovery.

8. A method comprising:
   receiving an optical signal (Z); and
   calculating an error $\epsilon$ signal, representative of distortion in the optical signal (Z), by utilizing a plurality of reference circles cascaded relative to each other, wherein the error $\epsilon$ signal is defined by $\epsilon = f_2(f_1(|Z|, C_1), C_2)$, wherein each of the reference circles $C_1$, $C_2$ have different radii R1, R2, the reference circles $C_1$, $C_2$ defined by:

$$C_1 = \frac{R1^p + R2^p}{2}$$

$$C_2 = \left(\frac{R1^p - R2^p}{2}\right)^q$$

wherein p and q are selected order numbers,
   wherein $f_1$, $f_2$ are each two variable functions and $C_1$, $C_2$ are each constants, such that the two variable functions, $f_1$, $f_2$, and the constants, $C_1$, $C_2$, are determined to make $f_2(f_1(|Z|, C_1), C_2)$ approach zero for a quadrature amplitude modulation signal.

9. The method of claim 8, wherein utilizing the plurality of reference circles compensates for chromatic dispersion.

10. The method of claim 8, wherein utilizing the plurality of reference circles compensates for polarization mode dispersion.

11. The method of claim 8, wherein the plurality of reference circles have different radii, and each include a plurality of constellation points.

12. The method of claim 8, wherein the plurality of reference circles each have a different modulus.

13. The method of claim 8, wherein the quadrature amplitude modulation signal comprises an 8-quadrature amplitude modulation signal.

14. The method of claim 8, wherein the plurality of reference circles modify the optical signal (Z) to cause adaptive polarization recovery.

15. An apparatus, comprising:
a memory storing computer program instructions for compensating a received signal and adaptive polarization recovery; and
a processor communicatively coupled to the memory, the processor to execute the computer program instructions, which, when executed on the processor, cause the processor to perform operations comprising:
receiving an optical signal (Z); and
calculating an error $\epsilon$ signal, representative of distortion in the optical signal (Z), by utilizing a plurality of reference circles cascaded relative to each other, wherein the errors signal is defined by $\epsilon = f_2(f_1(|Z|, C_1), C_2)$, wherein each of the reference circles $C_1$, $C_2$ have different radii R1, R2, the reference circles $C_1$, $C_2$ defined by:

$$C_1 = \frac{R1^p + R2^p}{2}$$

$$C_2 = \left(\frac{R1^p - R2^p}{2}\right)^q$$

wherein p and q are selected order numbers,
wherein $f_1$, $f_2$ are each two variable functions and $C_1$, $C_2$ are each constants, such that the two variable functions, $f_1$, $f_2$, and the constants, $C_1$, $C_2$, are determined to make $f_2(f_1(|Z|, C_1), C_2)$ approach zero for a quadrature amplitude modulation signal.

16. The apparatus of claim 15, wherein utilizing the plurality of reference circles compensates for chromatic dispersion.

17. The apparatus of claim 15, wherein utilizing the plurality of reference circles compensates for polarization mode dispersion.

18. The apparatus of claim 15, wherein the plurality of reference circles have different radii, and each include a plurality of constellation points.

19. The apparatus of claim 15, wherein the plurality of reference circles each have a different modulus.

20. The apparatus of claim 15, wherein the quadrature amplitude modulation signal comprises an 8-quadrature amplitude modulation signal.

* * * * *